United States Patent [19]

Roach et al.

[11] Patent Number: 4,507,603
[45] Date of Patent: Mar. 26, 1985

[54] APPARATUS FOR THE MEASUREMENT OF THE MOVEMENT OF A MEMBER HORIZONTALLY RELATIVE TO A DATUM

[75] Inventors: Peter F. Roach, Warrington; Christopher J. Caldwell-Nichols, Abingdon; Alexander Thomson, Warrington, all of England

[73] Assignee: United Kingdom Atomic Energy Authority, London, England

[21] Appl. No.: 387,560

[22] Filed: Jun. 11, 1982

[30] Foreign Application Priority Data

Jun. 17, 1981 [GB] United Kingdom ................ 8118635

[51] Int. Cl.³ ............................................. G01R 27/26
[52] U.S. Cl. .................................... 324/61 P; 33/366; 33/392; 361/181
[58] Field of Search .............. 324/61 P, 61 R; 33/366, 33/363 Q, 312, 392; 361/181

[56] References Cited

U.S. PATENT DOCUMENTS

| 2,274,735 | 3/1942 | Peters et al. | 324/61 P |
| 2,604,512 | 7/1952 | Bacon et al. | 324/61 R |
| 2,633,028 | 3/1953 | Fillerbrown | 33/366 X |
| 2,825,978 | 3/1958 | Davis | 324/61 R X |
| 2,892,152 | 6/1959 | Buisson | 324/61 R |
| 3,323,699 | 6/1967 | Bricker, Jr. | 324/61 R X |
| 3,555,691 | 1/1971 | Jacoby | 33/312 |
| 3,997,976 | 12/1976 | Li | 33/366 X |

FOREIGN PATENT DOCUMENTS

| 1490389 | 5/1969 | Fed. Rep. of Germany | 324/61 R |
| 1111036 | 2/1956 | France | 324/61 P |

Primary Examiner—Stanley T. Krawczewicz
Attorney, Agent, or Firm—William R. Hinds

[57] ABSTRACT

A plumb bob (11) having an upwardly extending tube (12) is located in a support tube (10) having grooves (20) in which are laid sheathed cables (22). The support tube (10) has windows (21) across groups of which pass the bare conductor elements (23) of the cables (22). The upwardly extending tube (12) forms an energizing electrode and the bare conductor elements (23) form two pairs of orthogonally disposed electrodes (30) capacitatively related to the electrode formed by the upwardly extending tube (12). Horizontal movement of the support (10), and hence any structure in which it is located, creates a capacitative charge between the electrodes which allows the movement to be measured in magnitude and direction. The apparatus has one application to the measurement of horizontal movement in a liquid metal cooled nuclear reactor.

5 Claims, 3 Drawing Figures

APPARATUS FOR THE MEASUREMENT OF THE MOVEMENT OF A MEMBER HORIZONTALLY RELATIVE TO A DATUM

FIELD OF THE INVENTION

This invention relates to apparatus for the measurement of the movement of a member horizontally relative to a datum.

BACKGROUND OF THE INVENTION

The invention has one application to the problem of horizontal movement measurement in relatively inaccessible and hostile locations such as in the core of a liquid metal cooled nuclear reactor.

SUMMARY OF THE INVENTION

The invention provides apparatus for measurement of the movement of a member horizontally relative to a datum including means for capacitively resolving said horizontal movement from a measurement of the inclination of a plumb, the resolution being derived from two pairs of orthogonally disposed electrodes, in which the electrodes are provided by conductor elements of mineral insulated (MI) cables from which the outer sheath has been stripped over a limited length. The cables may be located in helical grooving in a cable support tube (which is, in effect, the horizontally movable member), surrounding the plumb, with windows cut in the tube through which the stripped lengths of cable can "look" at the plumb.

The plumb preferably consists of a weighted flexible steel "energising" cable with the bob of the plumb located below the MI cable support tube but with a narrow metal tube upwardly extending from the bob to the energising cable so as to reach into the support tube and be viewable through the windows of the support tube.

DESCRIPTION OF THE DRAWING

One form of the invention will now be described with reference to the accompanying drawings in which.

DESCRIPTION OF THE PREFERRED EMBODIMENT

Figure 1:
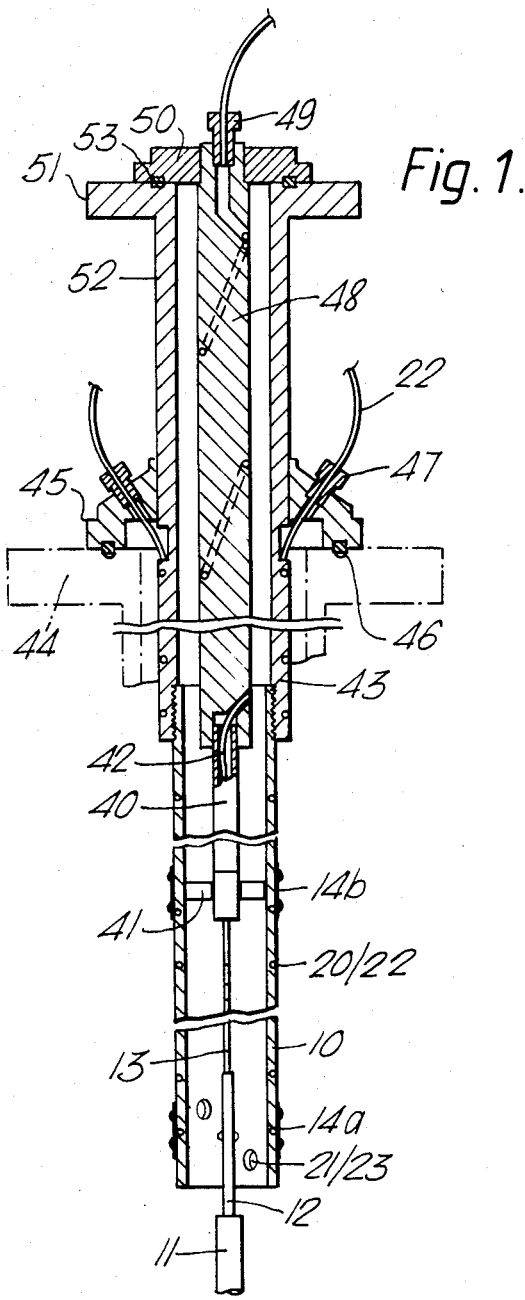
FIG. 1 is a simplified sectional elevation of a position measuring apparatus according to the invention.

In FIG. 1 the elements fundamentally related to the invention are a cable support tube 10 (which is a member capable of horizontal movement) and a plumb 11. The plumb is supported on a tube 12 of smaller diameter than that of the plumb, and which consequently extends upwardly from the plumb. The tube 12 reaches into the lower regions of the support tube 10 and forms the energised electrode of a capacitative measuring system. A flexible electrically energised support cable 13 is attached to the tube 12. By hanging the relatively wide plumb 11 below the tube 10 and providing the narrow tube 12 as the capacitative electrode, larger movement can be measured.

The tube 10 has a centralising band 14(a) which typically fits into a structure which may be subjected to horizontal movement in the course of its use. It is this movement which requires to be measured and this movement is transmitted to the lower end of tube 10 which moves relative to the plumb. A second centralising band 14(b) in effect laterally locates the plumb-line suspension point (by way of the tube 10) at the chosen datum or reference level.

Figure 2:
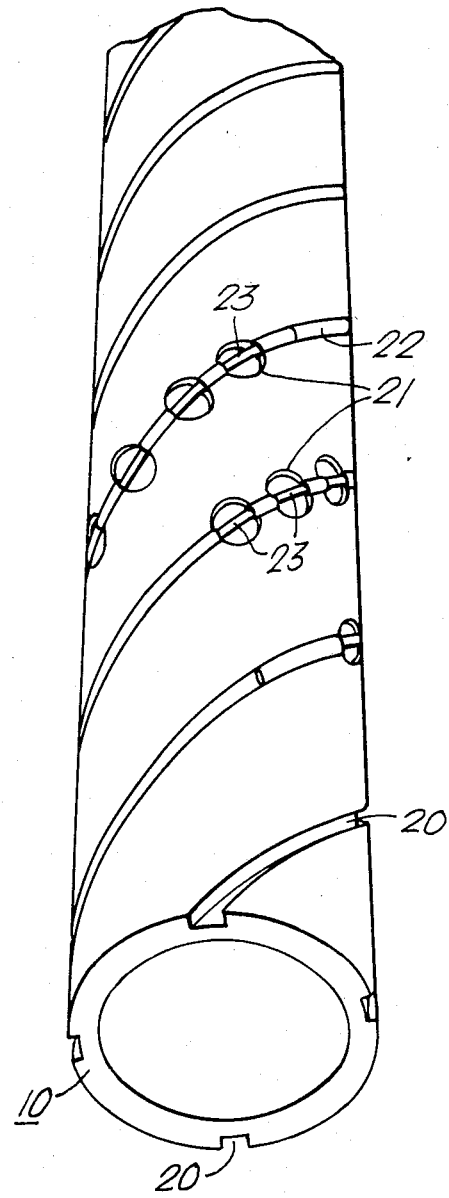
FIG. 2 is a perspective view of a cable support tube in the apparatus of FIG. 1.

The tube 10, as best seen in FIG. 2, has 4-start helical grooves 20 and windows 21 disposed along parts of the grooves. Mineral insulated cable 22 is laid in the grooves 20 and where it passes across the windows 21 the cable has had its outer sheath removed to expose bared conductors 23 which can be insulated with ceramic tubes. The windows 21 are arranged in four groups each of five windows; one group for each groove 20 and each five window group extending over approximately 110° of arc as shown by the lines 30 of FIG. 3. The windows 21 are protected and screened on the outside by a thin sheet of stainless steel tack welded to the tube 10.

Figure 3:
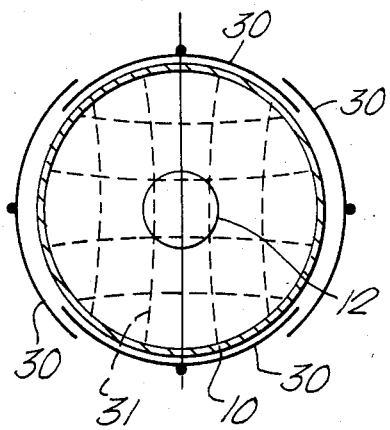
FIG. 3 is a plot of equi-potential lines in the cable support tube.

Thus the cables 22 each form a capacitor-electrode at the respective group of five windows 21 to operate in conjunction with the energised electrode formed by tube 12. As seen from FIG. 3, the lines 30 form two pairs of orthogonally disposed electrodes to relate the movement of the tube 10 to the plumb 11. The equipotential lines between the electrode pairs (i.e. lines of constant signal output from a differential amplifier fed from diagonal electrode pair) are also shown in FIG. 3 by the dash lines 31.

In order to present the fundamental elements described above into an operable unit a number of complementary elements are provided. These will now be described.

The plumb support cable 13 is carried in a tubular head 40 located in a double eccentric bush 41 so that the horizontal position of the tube 12 can be adjusted relative to the tube 10. A mineral insulated cable 42 passes through the bore of the head 40 to make electrical contact with the electrode (tube) 12 via the support cable 13. The energised support cable 13 is electrically connected to the MI cable 42 in the vicinity of the bush 41. An outer support tube 43 is shown passing through an access flange 44. The tube 43 is carried by a support flange 45 sealed to the access flange at a ring seal 46. The flange 45 has four glands 47 through which pass respective mineral insulated cables 22 to enter helical grooving in the tube 43 and the grooves 20 of tube 10. The cable 42 passes up tube 40 and then helically along a shielding boss 48 and emerges through a gland 49 in a flange 50 sealed to the flange 51 of a shield tube 52 at a ring seal 53.

One use for the above described apparatus is to measure movements of an anti-vibration grid located immediately above the core of a liquid metal cooled fast reactor. The apparatus can record oscillatory movements as well as nominally permanent deflections. In this context the use of the plumb 11 is suspended from the reactor roof which forms a reliable datum. It is capable of operation in temperatures of up to nearly 600° C. The capacitive measuring system is well adapted for use in confined spaces. Suitable capacitative measuring techniques are known and in this respect reference may be had to an article by Walton in Transducer Technology Vol No 5 July/August 1979. Typically the "X" and "Y" pairs of electrodes (lines 30 in FIG. 3) are connected to respective "X" and "Y" differential charge amplifiers and thence to meters. The centre electrode (tube 12) is provided with an excitation alternating voltage and the relative movement of the electrode pairs with respect to the centre electrode appears as "X" and "Y" coordinates on the meters.

We claim:

1. Apparatus for the measurement of the movement of a member horizontally relative to a datum characterised in that said apparatus includes means (12, 30) for capacitively resolving said horizontal movement from a measurement of the inclination of a plumb (11), said means for resolving horizontal movement comprises two pairs of orthogonally disposed electrodes (3) capacitively related to said plumb, and said electrodes (30) are provided by the conductor elements of mineral insulated cables (22) from which the outer sheath has been stripped over a limited length to expose bare conductors (23).

2. Apparatus as claimed in claim 1 characterised in that said conductor elements are located in grooves (20) in a support tube (10) for said cables and windows (21) are provided in the support tube through which the bare conductor elements (23) can look at the plumb.

3. Apparatus as claimed in claim 2 characterised in that the plumb is a flexible current conducting cable (13) with a weight bob at the end, the bob being located below the support tube (10) and having an upwardly extending tube (12) of smaller transverse dimension than that of the bob viewable through the windows (21) by the bare conductor elements and functioning as an electrode (12) cooperating capacitatively with the orthogonally disposed electrodes (30).

4. Apparatus as claimed in claim 3 characterised in that the flexible cable (13) is carried in a tubular head (40) located in a double eccentric bush (41) so that the horizontal position of the upwardly extending tube (12) can be adjusted horizontally relative to the support tube (10).

5. Apparatus as claimed in any preceding claim in which the support tube (10) is located in an anti-vibration grid located above the core of a liquid metal cooled fast reactor and the plumb is supported from the roof of the reactor.

* * * * *